United States Patent
Sforza-Heinen et al.

(10) Patent No.: US 6,616,851 B1
(45) Date of Patent: Sep. 9, 2003

(54) SYSTEM AND METHOD FOR TREATING WATER CIRCULATING IN OPEN-CIRCUIT COOLING SYSTEMS

(75) Inventors: Giancinto Sforza-Heinen, Moenchengladbach (DE); Norbert Wrede, Duesseldorf (DE); Wolfgang Schmitt, Wuppertal (DE); Alfred Werner-Busse, Duesseldorf (DE); Wolfgang Hater, Kaarst (DE); Jens Vier, Monheim (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 10/049,560

(22) PCT Filed: Aug. 5, 2000

(86) PCT No.: PCT/EP00/07610
§ 371 (c)(1),
(2), (4) Date: Jul. 10, 2002

(87) PCT Pub. No.: WO01/12558
PCT Pub. Date: Feb. 22, 2001

(30) Foreign Application Priority Data

Aug. 14, 1999 (DE) .................................. 199 38 615

(51) Int. Cl.⁷ .......................... C02F 1/00; B01D 33/04; B01D 33/48
(52) U.S. Cl. ...................... 210/774; 210/783; 210/791; 210/167; 210/181; 210/259; 210/400
(58) Field of Search ................... 210/774, 783, 210/791, 793, 97, 121, 123, 167, 181, 184, 198.1, 252, 259, 400, 402

(56) References Cited

U.S. PATENT DOCUMENTS

| | | | | |
|---|---|---|---|---|
| 3,296,122 A | * | 1/1967 | Karassik et al. | 210/603 |
| 3,405,037 A | * | 10/1968 | Aronson et al. | 202/173 |
| 3,759,387 A | * | 9/1973 | Drayton, Jr. | 210/98 |
| 4,483,772 A | * | 11/1984 | Rolke et al. | 210/601 |
| 4,485,013 A | * | 11/1984 | Cockman | 20/242.2 |
| 4,659,459 A | * | 4/1987 | O'Leary et al. | 210/87 |
| 4,981,594 A | | 1/1991 | Jones | |
| 5,013,415 A | | 5/1991 | Hudson | |
| 5,057,229 A | | 10/1991 | Schulenburg | |
| 5,145,585 A | | 9/1992 | Coke | |
| 5,660,723 A | | 8/1997 | Sanderson | |
| 5,855,791 A | * | 1/1999 | Hays et al. | 210/696 |
| 6,001,264 A | * | 12/1999 | Suzuki et al. | 210/697 |
| 6,235,257 B1 | * | 5/2001 | Palm et al. | 423/320 |

FOREIGN PATENT DOCUMENTS

| | | |
|---|---|---|
| CA | 1 172 576 | 8/1984 |
| DE | 31 50 073 | 6/1983 |
| EP | 0 305 897 | 4/1992 |
| SU | 1787137 | 1/1993 |

* cited by examiner

*Primary Examiner*—Fred Prince
(74) *Attorney, Agent, or Firm*—John F. Drach; Steven J. Trzaska

(57) ABSTRACT

A water treatment unit having: (a) a cooling tower; (b) a source of cooling water; (c) a main flow pipe for receiving the cooling water; (d) a source of fresh water connected to the source of cooling water; (e) a heat exchanger for heating the cooling water to form heated water; (f) a branched flow pipe for separating the heated water into a main stream of heated water and a partial stream of heated water; (g) a non-backwashable filter capable of separating waste contained in the partial stream of heated water into a compact waste residue and a first filtrate, in the absence of backwashing; and (h) a return pipe for transporting the main filtrate back to the cooling tower, wherein the cooling water is introduced through the main flow pipe into the heat exchanger where it is heated, after which it is split into a main stream of heated water and a partial stream of heated water, the main stream of heated water being transported back to the cooling tower, with the partial stream being transported, by way of the branched flow pipe, into the non-backwashable filter where it is separated into the first filtrate and the compact waste residue, the first filtrate then being transported to the cooling tower through the return pipe.

14 Claims, 1 Drawing Sheet

SYSTEM AND METHOD FOR TREATING WATER CIRCULATING IN OPEN-CIRCUIT COOLING SYSTEMS

BACKGROUND OF THE INVENTION

This invention relates to a water treatment unit for the circuit water of open-circuit cooling systems, more particularly for cooling tower circuits, comprising a pipe with a filter unit connected to the circuit water stream of the cooling circuit for branching off and returning a part stream of the cooling water and a pipe for adding fresh water connected to the circuit water stream.

Water treatment units are known, for example from EP 0305897 (Henkel KGaA). The circuit water is passed through heat exchangers where it is heated and then pumped to the cooling tower. Here, the water is cooled by evaporation in an air stream and is re-used for cooling plants, reactors, etc. With open cooling systems such as these, the water lost through evaporation has to be replaced. In addition, additives for preventing corrosion of metal components and for preventing the formation of organic, inorganic or biological deposits have to be added to the cooling circuit water. It is known that the evaporated water can be replaced by untreated water, for example drinking water or ground water, or by pretreated water, for example decarbonized or deionized water. Through the addition of salt-containing water, i.e. water containing calcium or magnesium chloride, the salts are concentrated in the cooling system and generally lead to deposits of calcium and magnesium, particularly at places where the temperature is relatively high. In addition, relatively high chloride levels promote corrosion. It is known that part of the cooling water can be periodically "flooded off" to keep the salt concentration within tolerable limits.

In order to reduce the concentration of suspended solids, it is known that part of the cooling water, generally 5% of the circuit water, can be removed from the circuit as a part stream and passed through filters where the suspended solids are removed from the cooling circuit water. The filters are periodically cleaned by backwashing with the cooling circuit water, the backwash water being discharged as wastewater. The backwash water contains only about 1% of solids. As a result of the above-mentioned flooding off of the cooling water and the discharge of the backwash water as wastewater, water treatment chemicals are lost and have to be replaced. With relatively large cooling systems, this requires an elaborate measuring and control system as described, for example, in the above-cited EP 0305897 B1.

In addition, in view of legal requirements and the sensitive chemical environment in the cooling circuit, particularly so far as corrosion and deposits are concerned, the cooling circuit water has to be frequently monitored by chemical analysis. Known systems operated with low-salt or salt-free water are not free from wastewater either because the filters are cleaned by backwashing and the backwash water is discharged. As a result of this loss of filter backwash water, therefore, the cooling circuit water again has to be frequently analyzed and water treatment chemicals continuously added.

Accordingly, the problem addressed by the present invention was to provide a unit of the type mentioned at the beginning for the treatment of circuit water of open circuit cooling systems and a corresponding treatment process which would satisfy the following requirements. Suspended solids would have to be largely removed from the circuit water to prevent the deposits and reduce corrosion. This applies in particular to solids with an abrasive effect. The unit would have to lend itself to operation with low-salt and, more particularly, salt-free water so that few, if any, corrosion-promoting substances, for example chloride ions or sulfate ions, would be present in the cooling circuit water. Wastewater-free operation would have to be possible so that water treatment chemicals would not be discharged. On the one hand, this would reduce operating costs and, on the other hand, would avoid the introduction of chemicals into receiving waters. The quantity of water to be added would have to be minimal; in particular, only the water evaporated in the cooling tower would need to be replaced. This requirement would be fulfilled in particular by wastewater-free operation of the unit. Particularly stable operation of the cooling system would have to be possible in order significantly to reduce the expense of monitoring by chemical analysis in continuously and discontinuously operated systems. Finally, the need for forced circulation during stoppages as necessary in the prior art would have to be eliminated.

DESCRIPTION OF THE INVENTION

Figure 1:
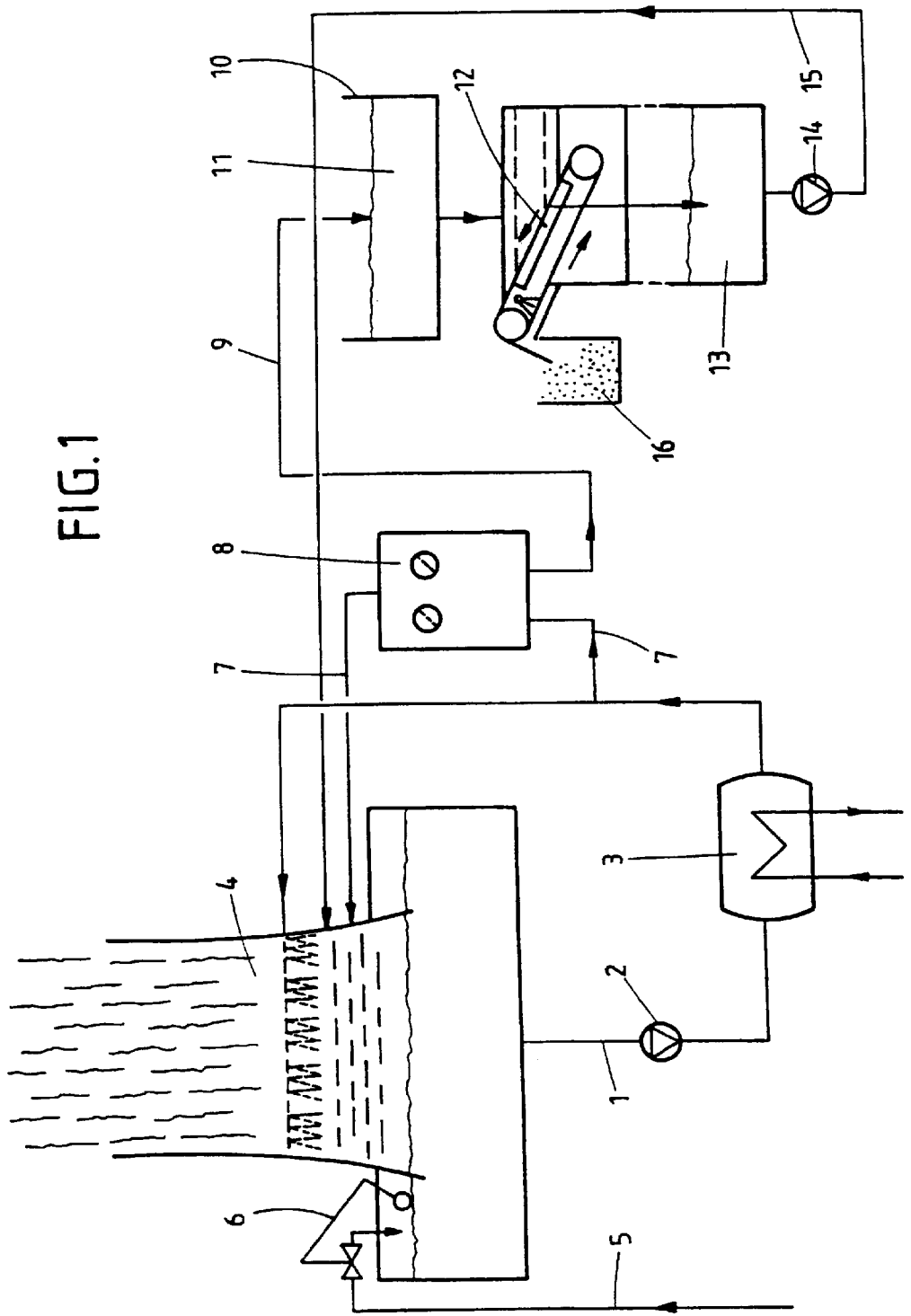
FIG. 1 is a schematic representation of one embodiment of the present invention.

According to the invention, the solution to this problem in a unit of the type mentioned at the beginning is characterized in that the filter unit comprises a filter which can be cleaned without backwashing, a compact residue, more particularly with a solids content of at least 30% by weight, being discharged during the cleaning operation.

A wastewater-free cooling system and a corresponding water treatment unit are obtained in this way, the filtrate of the filter being completely or almost completely recycled to the cooling circuit water. There is virtually no loss of water treatment chemicals in the process so that there is no need for these chemicals to be continuously replenished. Since no wastewater accumulates, operating costs are saved and no chemicals are introduced into receiving waters. Only the water lost through evaporation has to be replaced. However, the water added in the prior art to replace the wastewater accumulating during cleaning of the filter is saved. Because no water treatment chemicals are discharged, highly stable operation of the cooling system is possible and the expense of monitoring the concentration of water treatment chemicals can be considerably reduced both in continuously operated and in discontinuously operated systems.

In addition, safety in the workplace is increased because the handling and storage of relatively large quantities of water treatment chemicals, which are generally classified as hazardous materials, are considerably reduced in scale. Since the wastewater level is well below the threshold value for a water licence in Germany of 0.5 $m^3$ wastewater per day, operation of the cooling tower does not involve obtaining a water licence. Direct dischargers do not have to pay the wastewater rate.

The ecological advantages are considerable because wastewater-free operation saves water and relieves the receiving waters of water treatment chemicals.

The unit according to the invention eliminates the need for a continuous dosing facility for water treatment chemicals, as known from and necessary in the prior art, because there is hardly any discharge of chemicals.

The unit according to the invention and the corresponding process according to the invention described hereinafter may be used for all circuit cooling systems.

In order to avoid excessive losses of water treatment chemicals in the prior art, only a small part stream, based on the circulating cooling water, is filtered. By contrast, a considerably larger part stream can be filtered in the unit/process according to the invention with commensurately far more effective cleaning of the circuit water. In one particular embodiment, the part stream may comprise up to 50%, based on the circulating cooling water. This is because, according to the invention, there is no risk of water treatment chemicals being lost because there is no wastewater to be discharged.

In one simple embodiment, only one filter need be provided in the filter unit and can be cleaned without backwashing. In a particularly preferred embodiment, however, the filter unit comprises a backwashable first filter and a second filter which can be cleaned without backwashing, the first filter being connected to the inlet of the second filter by a pipe for the soiled backwash water and the filtrate outlet of the second filter being connected by a return pipe to the circuit stream of the open circuit cooling system. The first backwashable filter is used for directly cleaning the branched-off part stream of cooling circuit water. The part stream water or another part of the cooling circuit water is used for backwashing the first filter. The soiled backwash water is carried to the non-backwashable filter, the filtrate being passed back into the circuit. The residue collecting on the second filter is discharged in compact form so that almost all the water passing through the filter unit is recycled. The compact residue is easy to dispose of, for example by dumping as waste, because it is no more polluted than normal household refuse.

Various types of filter, for example non-backwashable drum filters and other filters, may be used as the filter that can be cleaned without backwashing. In a preferred embodiment, however, the filter to be cleaned without backwashing is a band filter.

In another embodiment, the fresh water pipe is connected to a source of deionized water. In this way, no new harmful salts are introduced into the circuit when the water evaporated in the cooling tower is replaced.

Alternatively, it is also of advantage for the fresh water pipe to be connected to a source of steam condensate. The same advantages are obtained in this case because the steam condensate is very low in salt. It accumulates in the superheated steam systems widely used on an industrial scale for heating reactors and other plant. The very low levels of solids in the condensate do not interfere with operation of the cooling system.

The present invention also relates to a process for treating circuit water of open circuit cooling systems, more particularly cooling tower circuits, in which a part stream of the cooling water is branched off, cleaned in a periodically cleaned filter unit and recycled and fresh water is added to the circuit water.

In this process, the solution to the problem stated above is characterized in that, to clean the filter unit, a compact residue containing in particular at least 30% by weight solids is discharged.

The part stream is preferably cleaned in a backwashable first filter, the first filter is periodically cleaned by backwashing with the part stream water, the soiled backwash water obtained is cleaned in a second filter, the residue on the second filter is discharged in compact form and the filtrate of the second filter is returned to the circuit water stream. This embodiment is particularly suitable for relatively large cooling systems because it works particularly effectively.

To replace the water evaporated in the cooling tower, it is of advantage to add only low-salt fresh water and, more particularly, salt-free fresh water to the circuit water. In a first advantageous variant, deionized water is added to the circuit water as fresh water. In a second equally advantageous variant, steam condensate is added to the circuit water as fresh water. This affords the further advantage that the steam condensate which accumulates in any event, but which cannot be used for steam generation because of possible contamination, can be put to effective use optionally after the recovery of heat—and need not be discharged as wastewater which would normally be the case. The associated economic and ecological advantages are obvious.

Because of the very low calcium and magnesium concentrations in the cooling circuit water, deposits are prevented. Optimal heat transfer is always achieved and circulation energy can be reduced. Maintenance costs are saved by virtue of the low corrosion rate and the absence of deposits. In discontinuously operated systems, there is no need for forced circulation during stoppages. These advantages are particularly relevant when low-salt or salt-free water is introduced as fresh water into the cooling circuit water, optionally together with a suitable corrosion inhibitor.

One example of embodiment of a unit according to the invention is described in detail in the following with reference to the accompanying drawing which is a schematic flow chart of the unit.

The cooling system which is open to the atmosphere and free from "flood-off" water is a wastewater-free cooling system operated with low-salt or deionized water. The solids suspended in the cooling water are discharged in compact form through a filter system, the filtrate being completely recycled to the circuit. In this circuit-type cooling system, the cooling water is recycled through a single-stage or multi-stage filtration unit. The percentage of water to be filtered, based on throughput, can be from 5 to 100%. The filtrate is completely recycled to the cooling tower. Losses of liquid are replaced by salt-free or low-salt water. The filtration residue is dry and compact and may be disposed of as waste. No wastewater accumulates during the operation of the system. A two-stage filtration system is shown in FIG. 1 and is described in more detail in the following.

Suitable corrosion inhibitors are any known combinations, molybdenum compounds being preferred. The system may be operated across the entire pH range, preferably at pH 6 to 9 where molybdenum compounds are used. The system is stable in operation through the absence of wastewater. In general, there is no need for pH readjustment.

The system may be operated with all the usual biocides, but is preferably operated with those which leave no decomposition residues in the cooling circuit water, for example hydrogen peroxide and ozone.

In the unit shown in FIG. 1, cooling water is pumped (circulation pump 2) through a main flow pipe 1 to a consumer, i.e. a heat exchanger 3, and from there into a cooling tower 4 where the water heated in the heat exchanger 3 cools down again. From the cooling tower 4, the water is fed back into the pipe 1.

The water evaporated in the cooling tower 4 is replaced via a fresh water pipe 5 fed with deionized water or steam condensate. A level governor 6 arranged at the outlet of the pipe 5 is schematically illustrated in FIG. 1.

Connected to the circuit water stream flowing through the pipe 1 is a pipe 7 for branching off a part stream which, after cleaning in a first filter 8, is returned to the circuit water. The first filter 8 is periodically cleaned by backwashing with the part stream water. The soiled backwash water is collected via a pipe 9 in a tank 10 for the soiled backwash water 11 and is delivered from the tank 10 to a band filter 12. The filtrate 13 obtained is pumped back (pump 14) through a return pipe 15 to the circuit water stream—in the present example directly to the cooling tower 4. The compact dry residue left on the band filter 12 drops into a solids container 16 and is collected there for disposal as waste.

What is claimed is:

1. A water treatment unit comprising:
   (a) a cooling tower;
   (b) a source of original cooling water;
   (c) a main flow pipe for receiving the cooling water;
   (d) a source of fresh water cooling water;
   (e) a heat exchanger for heating the cooling water to form heated water;
   (f) a branched flow pipe for separating the heated water into a main stream of heated water and a partial stream of heated water;
   (g) a non-backwashable filter capable of separating waste contained in the partial stream of heated water into a compact waste residue and a first filtrate, in the absence of backwashing; and
   (h) a return pipe for transporting the first filtrate back to the cooling tower, wherein the cooling water is introduced through the main flow pipe into the heat exchanger where it is heated, after which it is split into a main stream of heated water and a partial stream of heated water, the main stream of heated water being transported back to the cooling tower, with the partial stream being transported, by way of the branched flow pipe, into the non-backwashable filter where it is separated into the first filtrate and the compact waste residue, the first filtrate then being transported to the cooling tower through the return pipe.

2. The water treatment unit of claim 1 wherein the primary filter is a band filter.

3. The water treatment unit of claim 1 wherein the source of fresh water is deionized water.

4. The water treatment unit of claim 1 wherein the source of fresh water is a steam condensate.

5. The water treatment unit of claim 1 further comprising a backwashable filter for receiving the partial stream and initially separating it into waste and a preliminary filtrate, the preliminary filtrate then being transported into the non-backwashable filter.

6. A water treatment unit comprising:
   (a) a cooling tower;
   (b) a source of original cooling water;
   (c) a main flow pipe for receiving the cooling water;
   (d) a source of fresh cooling water;
   (e) a heat exchanger for heating the cooling water to form heated water;
   (f) a branched flow pipe for separating the cooling water into a main stream of heated water and a partial stream of heated water;
   (g) a backwashable filter capable of initially separating the partial stream of heated water into waste and a preliminary filtrate;
   (h) a non-backwashable filter connected to the backwashable filter, the non-backwashable filter being capable of separating the preliminary filtrate into a compact waste residue and a main filtrate; and
   (i) a return pipe for transporting the main filtrate back to the cooling tower, wherein the cooling water is introduced through the main flow pipe into the heat exchanger where it is heated, after which it is split into a main stream of heated water and a partial stream of heated water, the main stream of heated water being transported back to the cooling tower, and the partial stream of heated water being transported, by way of the branched flow pipe, into the backwashable filter where it is separated into waste and a preliminary filtrate, the preliminary filtrate then being transported into the non-backwashable filter where it is separated into the main filtrate and the compact waste residue, the main filtrate then being transported back to the cooling tower through the return pipe.

7. The water treatment unit of claim 6 wherein the primary filter is a band filter.

8. The water treatment unit of claim 6 wherein the source of fresh water is deionized water.

9. The water treatment unit of claim 6 wherein the source of freshwater is a steam condensate.

10. A process for treating circuit water of open circuit cooling systems comprising:
    (a) providing a cooling tower;
    (b) providing a source of original cooling water;
    (c) providing a main flow pipe for receiving the cooling water;
    (d) providing a source of fresh cooling water connected to the source of cooling water;
    (e) providing a heat exchanger for heating the cooling water to form heated water;
    (f) transporting the cooling water from the source of cooling water to the heat exchanger, by way of the main flow pipe;
    (g) providing a branched flow pipe for separating the heated water into a main stream of heated water and a partial stream of heated water;
    (h) transporting the main stream of heated water to the cooling tower;
    (i) providing a non-backwashable filter;
    (j) transporting the partial stream of heated water into the non-backwashable filter where it is separated into a compact waste residue and a main filtrate, in the absence of backwashing;
    (h) providing a return pipe;
    (k) transporting the main filtrate, through the return pipe, back to the cooling tower; and
    (l) periodically introducing fresh cooling water into the original source of cooling water.

11. The process of claim 10 wherein the primary filter is a band filter.

12. The process of claim 10 wherein the source of fresh water is deionized water.

13. The process of claim 10 wherein the source of fresh water is a steam condensate.

14. The process of claim 10 further comprising providing a backwashable filter for initially separating the partial stream of heated water into waste and a preliminary filtrate, the preliminary filtrate then being introduced into a primary filter, and wherein a backwashable filter is periodically backwashed using the partial stream of heated water, thus forming backwash water which is then transported into the non-backwashable filter for separation into compact waste residue and main filtrate.

\* \* \* \* \*